UNITED STATES PATENT OFFICE.

EDUARD JALOWETZ, EMIL RICHTER, AND ALBERT SCHÜCKHER, OF VIENNA, AUSTRIA-HUNGARY.

PROCESS FOR IMPROVING WATER FOR BREWING AND MALTING PURPOSES.

1,172,528. Specification of Letters Patent. Patented Feb. 22, 1916.

No Drawing. Application filed January 18, 1912. Serial No. 671,925.

*To all whom it may concern:*

Be it known that we, Professor EDUARD JALOWETZ, EMIL RICHTER, and ALBERT SCHÜCKHER, subjects of the Austro-Hungarian Emperor, residing at Vienna, Austria-Hungary, have invented certain new and useful Improvements in Processes for Improving Water for Brewing and Malting Purposes, of which the following is a specification.

The carbonate of lime and carbonate of magnesia contained in the brewing water exercise injurious effects in various respects. In order to avoid the disadvantages of carbonate of lime and carbonate of magnesia in brewing water it has heretofore been the practice to reduce as far as possible the proportion of carbonates, both in the mashing water and also in the sparging water, by boiling or at least heating the water and allowing the salts precipitated to settle. By treating the water in this manner the carbonate of lime only is separated in considerable quantities. In order to remove and render harmless the more objectionable carbonate of magnesia, it is necessary to mix the water before boiling with a corresponding quantity of chlorid of calcium, whereupon carbonate of lime and chlorid of magnesium are produced by a double reaction. According to another process, the so-called "Burtonizing" which consists in the addition of gypsum to the mash, carbonate of magnesia is converted into sulfate of magnesium, a compound which also has very unfavorable special qualities.

The improvement of the water for the purpose of brewing by thoroughly separating therefrom the carbonates of alkaline earths, can be effected according to this invention in a much simpler manner and without the use of chemical agents, by simply heating the water under pressure and simultaneously vigorously agitating it and then separating the precipitates therefrom by filtration or decantation. By this treatment both the carbonate of calcium and the carbonate of magnesium contained in the water are precipitated in very considerable quantities after a brief treatment. At the same time the proportion of salts which are beneficial in the brewing water, such as calcium chlorid and sulfates of alkalies, are left completely without modification or almost completely as for instance is the case with reference to sulfates of alkaline earths.

In carrying out the process the water is heated and simultaneously given an eddy motion in a closed and incompletely filled tank. The water is vigorously agitated while being boiled, either by means of the heating steam, or by means of mechanical stirring devices. The advantage of this method over the method of simple heating under pressure is, that the precipitation of the salts is independent of the degree of concentration. Moreover, the heat energy is more completely utilized and owing to the vigorous motion of the liquid the water is more thoroughly freed from carbonates.

We are aware of the process described in United States Patent No. 925,283, which is directed to a method for preventing the formation of scale on the walls of steam boilers. In that method, feed water for boilers is boiled in closed and incompletely filled tanks with simultaneous vigorous agitation in order to precipitate a portion of the scale forming substances in the form of a fine powder floating in the water. The said feed water together with the floating powder therein is then introduced into the boiler. It is important to note however that this process is based on the fact that the exceedingly fine powder separated by such treatment from the water is introduced along with the water to prevent the adhesion of the scale forming substances on the walls of the boiler. The scale forming substances crystallize out of the water during the concentration of the water in the boiler and chiefly consist of sulfates. It has been attempted to explain the operation of that process by assuming that the suspended particles in the boiler feed water serve by their friction on the walls of the boiler to prevent the adhesion on said walls of the precipitates formed in the boiler itself. It may be that the small crystals finely distributed in the boiler water, act to a certain extent, as centers of crystallization which attract the scale forming substances crystallized out in the boiler, so that a solid deposit cannot be formed on the boiler walls. Whatever the theory of the operation may be, it is clear that the intention in that process is merely to produce by a given method of boiling a certain physical nature of the precipitate, and neither the quantity nor the chemical nature of the said precipitate, has anything whatever to do with the process. On the contrary, in the process according to our invention, the micro-crystalline nature of the precipitate has no importance whatever. For the purpose of the subsequent separation it would even have been preferable to obtain a coarser precipitate.

The important point of our process, namely, the extensive precipitation of carbonates, more particularly of carbonates of magnesium, is not in any way disclosed by such a process for preventing the formation of boiler scale. In our process the precipitation of the carbonates is practically complete and requires but a very short time.

According to our process the precipitate produced by the boiling of the water during vigorous agitation, must be completely removed in order to make the product suitable for brewing purposes, and for use as mashing and sparging water. This filtration preferably follows immediately after the boiling as it has been found that it is not desirable to leave the water, which has been deprived of carbonate, for a long time in contact with the salts precipitated. Water filtered immediately after the treatment shows a completely neutral reaction, whereas water left standing on the precipitate shows an increase in hardness and has a strong alkaline reaction and is not so suitable for use for brewing purposes. This is probably due to the fact that the carbonate of magnesium being partly precipitated in the form of oxyhydrate of magnesium is again dissolved when left standing, owing to the exceedingly fine form of the precipitate. Unless the precipitate is immediately removed therefore an important advantage of our process is lost, because the salts of magnesium will otherwise return into solution.

By a process according to this invention, water containing a very large proportion of carbonates can be deprived of these injurious ingredients and more particularly of carbonates of magnesium, the water being freed to such an extent as to convert it into an excellent brewing water. This is an exceedingly important advantage on account of the great importance of the properties of the water for the particular character of the beer. For instance, water for brewing of light beer of the Pilsen type can be made suitable by our process from water otherwise unsuitable for that purpose. The practical results of the process are surprisingly favorable.

We claim:

1. The process of purifying water which comprises heating the water and simultaneously vigorously agitating all the particles thereof to cause a precipitation of carbonates throughout all particles of said water and removing the precipitate from said water.

2. The process of purifying water which comprises heating the water and simultaneously vigorously agitating all the particles thereof to cause a precipitation of carbonates throughout all particles of said water and immediately removing the precipitate from said water.

3. The process of purifying water which comprises heating the water above the boiling point in a closed vessel and simultaneously vigorously agitating all the particles thereof to cause a precipitation of carbonates throughout all particles of said water and removing the precipitate from said water.

4. The process of purifying water which comprises heating the water above the boiling point in a closed vessel, and simultaneously vigorously agitating all the particles thereof to cause a precipitation of carbonates throughout all particles of said water and immediately removing the precipitate from said water.

5. The process of purifying water for brewing purposes which comprises heating the water in a partially filled closed vessel and simultaneously vigorously agitating all the particles thereof the temperature of the water being raised so much above the boiling point that under the vigorous agitation magnesium carbonate in all particles will be precipitated and removing the precipitate from the water.

In testimony whereof we have affixed our signatures in presence of two witnesses.

PROF. EDUARD JALOWETZ.
ING. EMIL RICHTER.
ALBERT SCHÜCKHER.

Witnesses:
Dr. RICHARD REITZ,
AUGUST FUGGER.